United States Patent [19]

Willingham et al.

[11] Patent Number: 5,125,713
[45] Date of Patent: Jun. 30, 1992

[54] COVER FOR OPEN TOPPED COMPARTMENTS WHICH IS MOVABLE BETWEEN STOWED AND COVERING POSITIONS

[76] Inventors: Larry Willingham, 1539 S. Grade Rd., Alpine, Calif. 92001; Lynn Chenowth, 1581 Greenfield Dr., El Cajon, Calif. 92021

[21] Appl. No.: 751,333

[22] Filed: Aug. 28, 1991

[51] Int. Cl.⁵ .............................................. B60P 7/04
[52] U.S. Cl. ...................................... 296/98; 160/242
[58] Field of Search ............ 296/98; 160/266, 267.1, 160/268.1, 290.1, 395, 242

[56] References Cited

U.S. PATENT DOCUMENTS 2,811,321 10/1957 Barre ..................... 296/98 X
3,423,126 1/1969 Galvin et al. ............. 296/98
4,842,323 6/1989 Trickett ..................... 296/98

FOREIGN PATENT DOCUMENTS 1143412 3/1983 Canada ..................... 296/98

Primary Examiner—Dennis H. Pedder
Attorney, Agent, or Firm—Frank D. Gilliam

[57] ABSTRACT

A cover system for preventing loss of loose material such as sand, gravel or plant clippings from open topped compartments such as dump truck bodies or trailers, storage bins or the like. The cover system includes a roller system for moving a cover sheet from a first, stowed, position away from the open compartment top to a second, deployed, position in which material in the compartment is closely confined by the cover sheet.

19 Claims, 3 Drawing Sheets

COVER FOR OPEN TOPPED COMPARTMENTS WHICH IS MOVABLE BETWEEN STOWED AND COVERING POSITIONS

BACKGROUND OF THE INVENTION

This invention relates in general to covers for open topped compartments and, more specifically, to a cover that is easily moved between stowed and deployed, covering, positions and maintains control over loose material in an open topped compartment.

Open topped compartments such as dump trucks, vehicle trailers, storage bins and the like used to store or carry particulate material are subject to having the material fall or blow out in use. With trucks or trailers hauling sand, gravel, dirt or similar materials, having portions of the load fall out onto the roadway is undesirable both from the point of view of littering the area and the danger of the material striking a following vehicle, possibly breaking the windshield and causing an accident. Similarly, trucks or trailers carrying lightweight materials such as plant clippings being taken to a landfill, mulch materials, harvested plants such as cotton, or fixed storage bins holding such materials are liable to having gusty winds blow portions of the contents out of the vehicle or bin.

Many localities now have laws requiring that all such open topped vehicle compartments be covered when containing loose or lightweight materials. Often, the loads are simply covered with a tarpaulin that is tied to the edges of the open top at intervals around the opening. While sometimes effective, such tarpaulins are difficult for one person to put in place, especially in windy conditions and material may fall out between tie-down points where the material is heaped above the top of the compartment. Installing the cover is time consuming and must be carefully done to prevent an edge of the cover from coming loose and allowing loss of part of the loose contents.

Attempts have been made to provide more convenient covers which can be moved from a stowed position to a covering position by one person. Generally, these systems have the cover wrapped around a roller at one end of the open top while the vehicle or bin is being loaded or emptied. Once filled, the cover is pulled to unroll it over the opening and fastened to the end opposite the roller. When the load is to be removed, the fasteners are unfastened and the roller is rotated, such as by a crank, to roll up the cover. While more convenient than a loose tarpaulin, these cover systems are difficult to deploy where the load is heaped up at the center above the height of the roller. In such cases the cover often only contacts the peak of the heaped material and does not conform to the shape of the heaped load, so that air can enter and portions of the load can blow or be jostled out of the opening.

Thus, there is a continuing need for improvements in covers for open topped compartments that are easily installed by one person, even where the load is in a heap extending up above the edges of the opening, and which will engage and fully restrain movement of the loaded material.

SUMMARY OF THE INVENTION

It is, therefore, an object of this invention to provide a deployable cover for open topped compartments that will fully restrain material loaded in the compartment. Another object is to provide a deployable cover system for open topped compartments that can be easily moved between stowed and deployed positions by one person. A further object is to provide a cover for open topped compartments that will closely contact a heap of material, the peak of which extends above the walls of the compartment.

The above-noted objects, and others, are accomplished in accordance with this invention by a cover system for open topped compartments of the sort having walls or edges surrounding an approximately horizontal top opening.

A pair of spaced, substantially parallel, arms are adapted to be mounted at opposite sides along one end of the opening, by means of pivots intermediate the ends of the arms. Preferably, a bar extends between the arms to cause the arms to pivot in unison. A roller extends between upstanding first ends of the arm across the first end of the opening. A sheet of material is secured to the roller and rolled up thereon in the stowed position. A spring arrangement biases the roller toward the stowed direction.

Shock absorbers are adapted to be connected between second ends of said arms and the compartment walls. The shock absorbers bias the arms toward a stowed position in which the first, roller carrying, ends extend upwardly.

When the sheet is pulled toward the second, opposite end of the opening, the roller rotates with the spring arrangement gradually increasing resistance to unrolling. As the sheet approaches the fully deployed position this resistance reaches a point where the pull on the arm overcomes the shock absorber forces so that the arm swings with the sheet to a generally horizontal position extending toward the second end to the point where it engages a heap of material in the compartment. When fully extended across the load, the sheet is secured to the second end of the opening.

The sheet closely conforms to a heap of material in the compartment and is biased against the load by a combination of the roller spring keeping the sheet taut and the shock absorber accommodating any movement of the heaped material, such as when a vehicle mounting the compartment hits a bump in the road.

Preferably the sheet is deployed by a leader such as a rope or the like secured near the center of the free edge of the sheet, the rope including means for securing the rope to the exterior of the container when the sheet is fully deployed. In order to guide the free edge of the sheet over a heap of material in the compartment, a slide means is preferably provided along the free edge of the sheet, including a plate angled upwardly and in the direction of sheet movement, so as to slide up the face of a heap of material and not dig into the heap and cause material to get onto the upper surface of the sheet.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
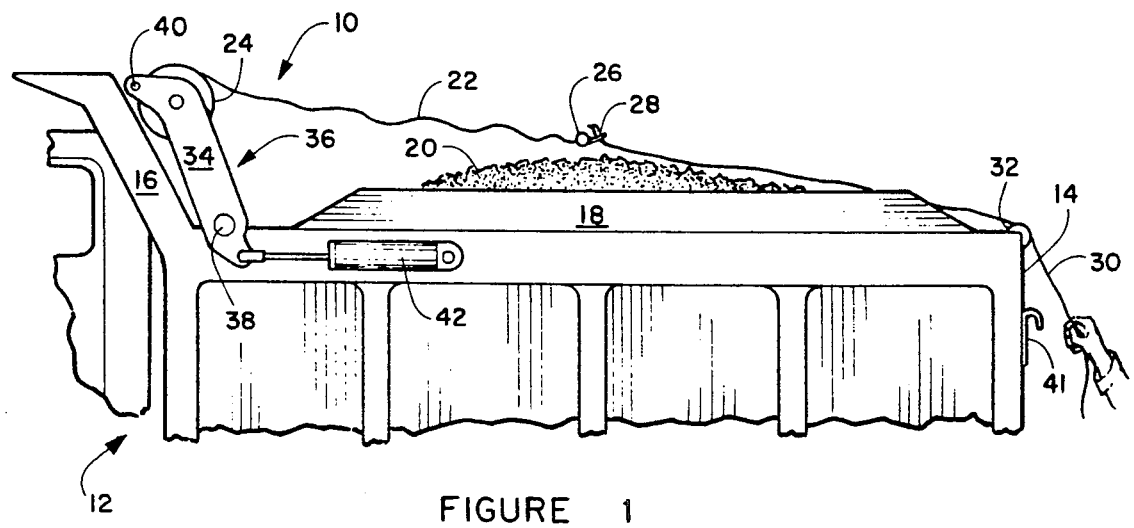
FIG. 1 is a schematic side view of the deployable cover in the partially deployed position.

Referring now to FIG. 1, there is seen the deployable cover system 10 in a partially deployed position. System 10 is in this case mounted on an open topped compartment 12 which may be the body of a dump truck, trailer, storage bin or the like. In the embodiment shown, compartment 12 is the body of a conventional dump truck having metal walls 14, an upstanding forward lip 16, wood side rails 18 and contains a load of gravel 20 in a peaked heap extending above side rails 18.

A cover 22, made of any suitable sheet material such as canvas or plastic material, is fully rolled around roller 24 in the stowed position at the first or front end of compartment 12 and can be unrolled toward the second or back end of the compartment. Unrolling has begun in the stage illustrated in FIG. 1. A transverse stiffening rod 26 is inserted in a hem along the leading edge of cover 22. A ring 28 is provided at the center of rod 26 for attachment of a leader means such as a conventional rope 30. Any elongated leader means such as one or more straps, ropes, cables or the like could be used as a leader for pulling the cover over the open compartment top. A conventional rope is used in the illustrated embodiment. A guide 32 is preferably provided over the edge of wall 14 to assure that the rope remains centered and prevent abrasion of the rope on the wall edge. Two or more hooks 41 are provided to receive and hold rod 40 when cover 22 is fully deployed. The rope 30 may be stowed in any suitable manner, such as by coiling it around hooks (not shown) on wall 14 or untying it from ring 28.

Roller 24 is rotatably mounted on a first end 34 of each of a pair of arms 36 which are pivotally mounted at pivot 38 intermediate the arm ends at the two side walls of compartment 12. A bar 40 extends across the front end of compartment 12 between the two arms 36 to maintain the arms in a parallel arrangement and provide support as the arms pivot together. Roller 24 is internally spring loaded to bias the roller toward the stowed position in which cover 22 is fully wound on roller 24. As detailed below, this spring biasing force increases as cover 22 is unwound from roller 24.

A shock absorber 42 is connected to second end 44 of arm 36. Shock absorber 42 biases arm toward the upright, stowed position of FIG. 1. Where a lip 16 is provided on compartment 12, shock absorber 42 will cause the upper edge of first arm end 34 to be pressed against lip 16. Where no lip 16 is provided, shock absorber will have a neutral position with arm substantially upright in the stowed position. Shock absorber 42 also serves to accommodate impacts or jolts as a vehicle carrying compartment 12 is moved, which might shift the load and impose forces on arm 36 or cover 22. Shock absorber 42 is described in detail below.

Figure 2:
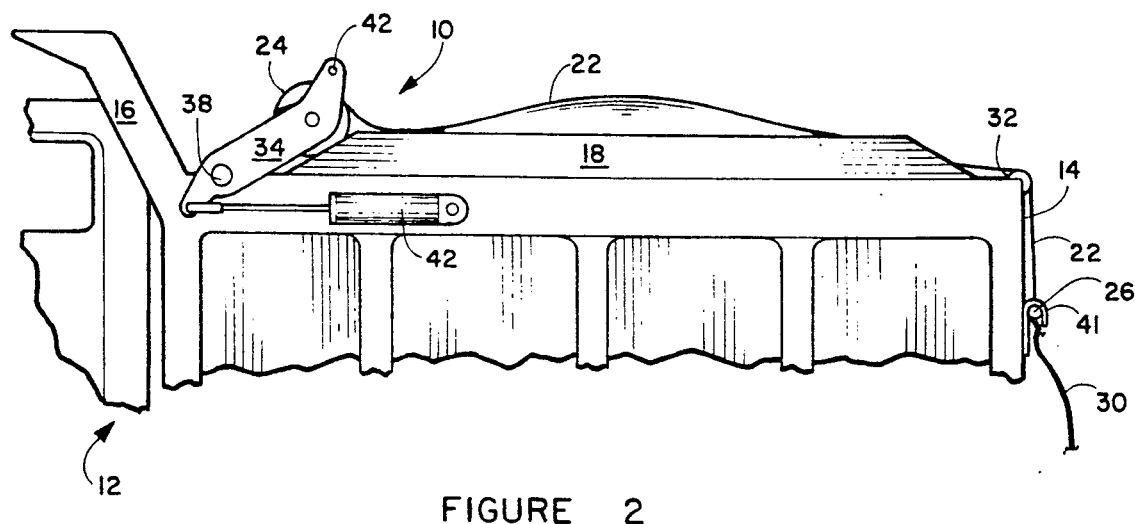
FIG. 2 is a schematic side view of the deployable cover in the fully deployed position.

FIG. 2 shows the cover system in the fully deployed position. As cover 22 unwinds from roller 24, the spring tension increases within the roller, as detailed below. Tension in roller 24 and/or shock absorber 42 is adjusted so that when the cover is about 75% deployed, the roller spring force resisting unwinding overcomes the shock absorber forces biasing arm toward the upright position, so that arm 36 pivots to bring roller 24 forward and downward to the position shown in FIG. 2. Thus, during initial covering of gravel load 20, the cover is held up to move easily over the top of the heap, then when covering is nearly complete and the leading edge of cover 22 has passed over the peak of the load 20, the cover is lowered to contact the load. This assures good contact with the material, particularly along the aft end, to prevent loss of material during vehicle movement, due to winds, etc. The length of arm 36 and the extent to which the arm rotates can be varied depending on the height of the expected loads, etc. Preferably, cover 22 is made from a somewhat elastic material so that the deployed cover conforms somewhat to the shape of a heaped load.

When the compartment is to be loaded, typically by a front loader dumping material into the open top, or a load is to be dumped, typically through a bottom door in the case of trailers or through a tail gate with compartment tilting, cover 22 is moved to the stowed position. Rope 30 is pulled to release rod 26 from hooks 41 and tension in roller 24 is allowed to smoothly retract cover 22. As cover 22 is rolled up, shock absorber 42 returns roller 2 to the upright position. When the cover is fully rolled up, rope 30 can be moved to the side and compartment 12 is ready for loading or unloading, as the case may be.

Figure 3:
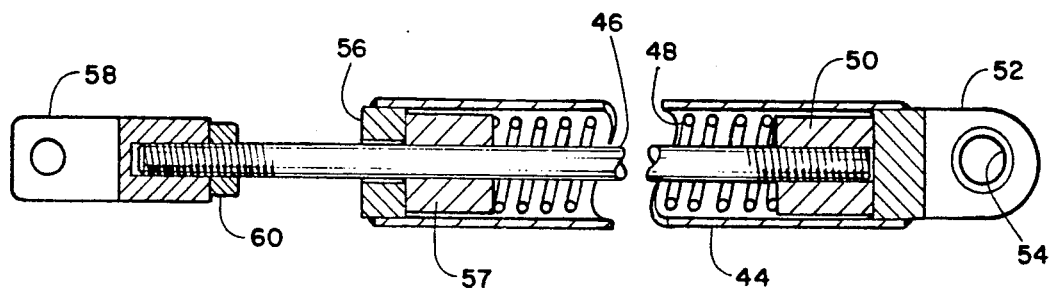
FIG. 3 is a substantially axial section view through the shock absorber used in the deployable cover system.

Details of shock absorber 42 are provided in FIG. 3, which shows a substantially axial section view through the shock absorber. Shock absorber basically comprises a square (or other non-round) cross section tube 44 containing a rod 46 which moves against spring 48 through an adjustable pre-loaded bushing 50 threaded onto rod 46. Tube 44 is closed at the distal end by end cap 52 secured to the tube, typically by welding, and includes an opening 54 to permit bolting to wall 14. The opposite end of tube 44 is closed by a cap 56 through which rod 46 passes. Preferably, a wear bushing 57 is provided between cap 56 and spring 48. The outer end of rod 46 is threaded into clevis 58 and secured by jam nut 60. Clevis 58 pivotally engages arm 36, as seen in FIG. 1 and 2.

Preload on arm 36 is adjusted by threading rod into or out of bushing 50 to the desired extent. The maximum rotation of arm 36 to the upright position (FIG. 1) may be limited by lip 16 so that shock absorber 42 biases arm 36 against lip 16 with bushing 50 spaced from end cap 52 in the fully stowed position. If a lip 16 or other similar projection is not present, shock absorber 42 will be adjusted so that bushing 50 (or the end of rod 46, if it extends beyond bushing 50 will engage end cap 52 with arm 36 in the desired upright position.

Figure 4:
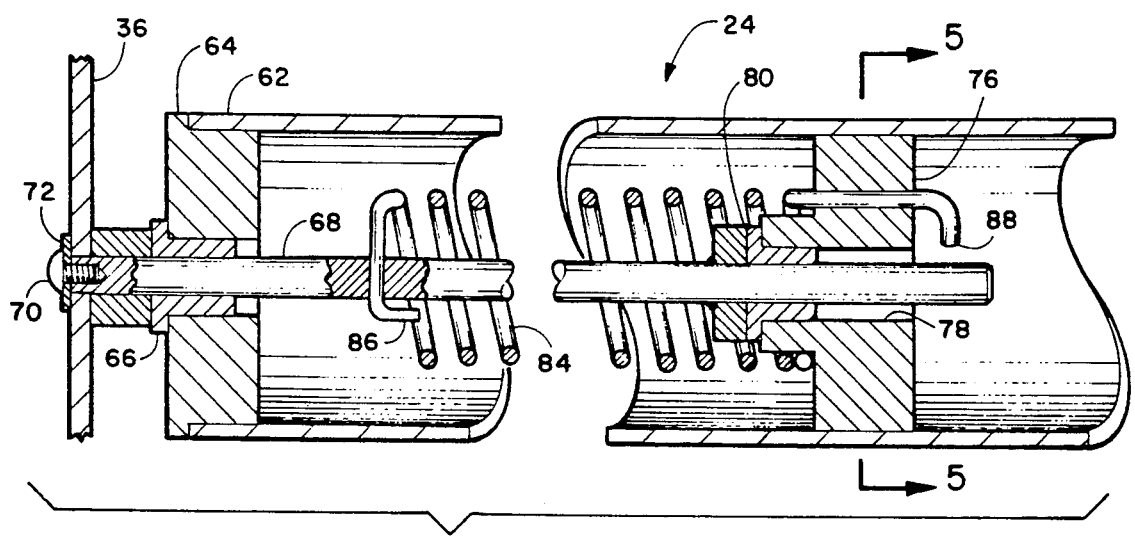
FIG. 4 is a substantially axial section view through the roller tube used in the deployable cover system.
Figure 5:
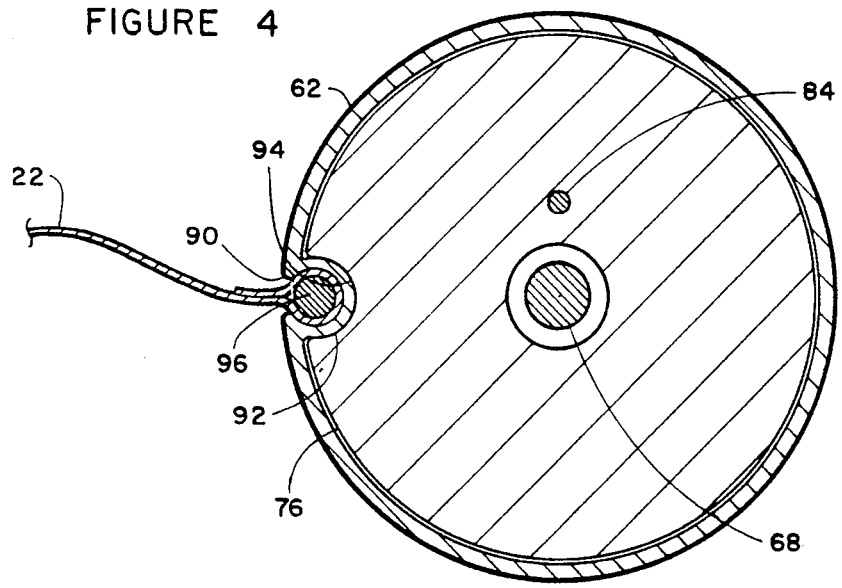
FIG. 5 is a transverse section view taken on line 5—5 in FIG. 4.

Details of roller 24 are provided in FIGS. 4 and 5. FIG. 4 is an approximately axial section through the drive end of roller 24. Roller 24 includes a round outer tube 62, typically formed from aluminum, having a pair of similar end caps 64 (only one of which is shown), typically formed from a suitable plastic such as polyvinyl chloride. Each end cap has an axial opening containing a bearing 66, typically an oilite bearing, through which a shaft 68 passes. The outer end of shaft 68 is rigidly secured to arm 36 by an end bolt 70 and washer 72. A spacer 74 establishes the desired spacing between roller 24 and arm 36.

The second end of roller 24 (not shown) includes the same arrangement of end cap 64, bushing 66, shaft 68, bolt 70, washer 72 and spacer 74 as shown on the drive end. However, the shaft used on the second end is a short stub shaft and does not include the drive means as described below although if desired a second, substantially identical drive arrangement could be included at the second end.

A torque block 76 rotatably positioned in tube 62 has an opening 78 containing a bushing 80, typically an oilite bearing, surrounding shaft 68. Bushing 80 abuts a thrust boss secured to shaft 68, typically by welding. A drive spring 84 surrounds shaft 68 and is secured at one end 86 to shaft 68 and the other end to torque block 76.

As seen in FIG. 5, there is a slot 90 running the length of tube 62. Slot 90 has a round cross section, with a narrow entrance to the slot. The interior wall 92 of slot 90 enters into a corresponding slot 94 in block 76, thus forcing block 76 to rotate with tube 62 while permitting movement of block toward the second end of the tube for removal and replacement as necessary as well as compensating for spring tension changes.

Slot 90 also provides a convenient means for securing the end of cover 22 to roller 24. A thin rod 96 in a hem along the edge of the cover can be slid into slot 90 from one end, and will be held in place by the narrow slot entrance.

Spring 84 can be provided with a preload as desired by rotating roller 24 in the deployment direction while holding the cover in the fully stowed position.

Figure 6:
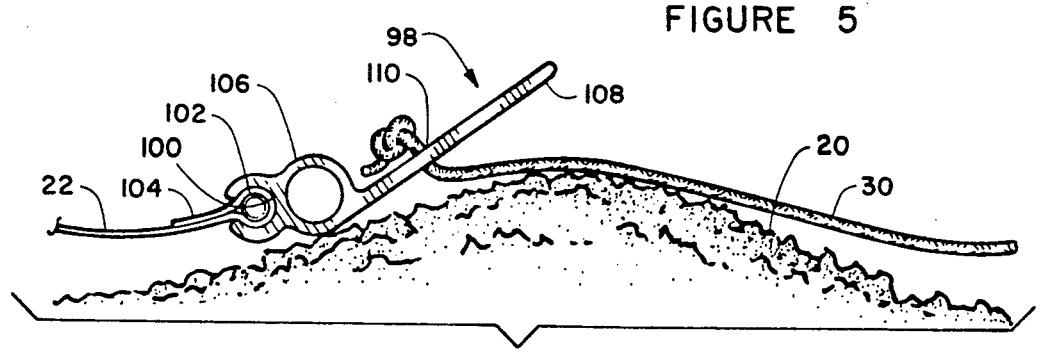
FIG. 6 is a schematic side view of a portion of the deployable cover system showing a preferred cover edge slide plate.

FIG. 6 illustrates a preferred means for assuring smooth deployment of the leading edge of cover 24 over a load that is heaped up at the center well above the sides of compartment 12. The bar 26 generally is effective in guiding the leading edge of cover 22 over the load 20 in compartment 12. However, where the material is especially finely divided, such as sand or dirt, and the load is heaped well above the sides of the opening, the bar may dig into the heap and cause some of the material to spill over on to the top of the cover. The cover edge slide means 98 is preferred for use in those circumstances. Plate 98 is typically an aluminum extrusion and has a length substantially equal to the width of the front edge of cover 22. A circular slot 100 in one edge of slide means 98 is adapted to have a rod 102 in hem 104 in cover 22 pushed into the slot from one end. Rod 102 is retained in place since the width of the entrance to slot 100 is less than the diameter of rod 102. A larger tube 106 is preferably included adjacent to slot 100 to add structural strength and resistance to bending of the slide means 98. An elongated plate 108 is formed as part of the extrusion, extending upwardly and forwardly away from the plane of cover 22 extending away from slot 100. A hole 110 is provided through plate 108 near the center thereof, adjacent to tube 106. Rope 30, extends through hole 110 and is knotted to hold it in place. As can be seen, when the leading edge of cover 22, slide means 98, encounters the heaped up load 20, plate 108 will cause the slide means 98 to slide up the face of the load and not dig in, preventing spillage of any of the heaped material.

Figure 7:
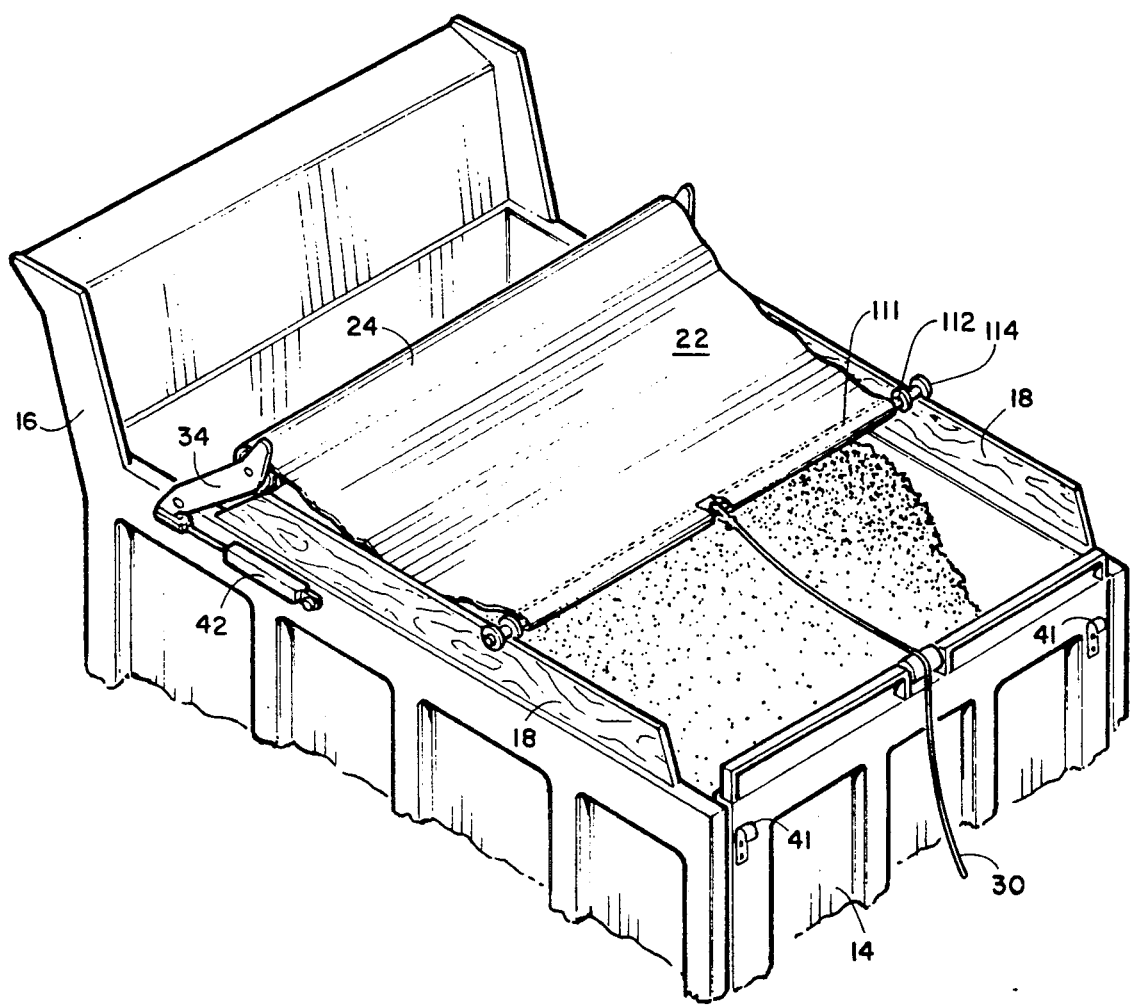
FIG. 7 is a plan view showing similar to the showing of FIG. 1 wherein a roller system is shown for ease of deployment.

Referring now specifically to drawing FIG. 7 which depicts a hem closure at the distal end of the tarp through which a rod 112 extends. On the distal ends of the rod a spool 114 is captured thereon which allows the tarp to be guided along side rails 18 during deployment.

Other applications, variations and ramifications of this invention will occur to those skilled in the art upon reading this disclosure. Those are intended to be included within the scope of this invention, as defined in the appended claims.

We claim:

1. A deployable cover for an open topped compartment which comprises:
   a pair of spaced substantially parallel pivotable arms adapted to be pivotally mounted intermediate their ends at locations adjacent to the opposite sides of a front end of an open topped compartment;
   said arms, when mounted, having first elongated ends movable from first, substantially upright, stowed, positions to deployed positions extending toward the opposite, back, end of said compartment;
   a roller extending between said first elongated arm ends;
   a sheet of cover material secured to said roller;
   spring means biasing said roller towards rotation in a direction tending to wrap said sheet about said roller;
   a second elongated arm end extending from each of said arms generally opposite each said first end;
   shock absorber means adapted to be connected between said opposite sides of said compartment and said second elongated arm ends, including means biasing said arms toward said upright stowed position;
   a leader secured to said sheet and extending away from said roller;
   whereby said leader may be pulled away from said roller to unroll and extend said sheet to the deployed position extending to the back end of said compartment and substantially covering said compartment and to rotate said arm to said deployed position during deployment of said sheet.

2. The deployable cover according to claim 1 including a stiffening rod, said stiffening rod enclosed in a hem along said front edge and having a ring secured to substantially the center of said rod, and wherein said leader is a single rope secured to said ring.

3. The deployable cover according to claim 1 further including a guide means at substantially the center of the back end of said compartment to engage said leader and assure straight movement of said cover and prevent abrasion of said rope on the compartment edge.

4. The deployable cover according to claim 1 further including a guide means along each side of the forward edge of said cover to assure straight movement of said cover.

5. The deployable cover according to claim 1 further including a slide means secured to a front edge of said cover, said slide means including an elongated tube, secured to said cover and a plate secured to said tube, said plate including means for fastening said leader to said plate adjacent to said tube, said plate extending at an angle to a straight line joining said front edge and said means for fastening whereby as said cover is pulled across said compartment and encounters a heap of material in said compartment extending above a horizontal plane through said roller, said plate will slide up and over said heap without digging into said heap.

6. The deployable cover according to claim 5 wherein said elongated tube includes a slot extending the length of said tube parallel to the tube axis; said slot having a substantially circular cross section and an entrance width less than the diameter of said substantially circular cross section, and the edge of said sheet engaging said roller includes a rod positioned in a hem along said edge, said rod and hem having a diameter no greater that the diameter of said circular slot and greater than the width of said entrance, whereby said rod and hem can be pushed longitudinally into said slot and will be retained therein.

7. The deployable cover according to claim 1 wherein the outer surface of said roller includes a slot extending the length of said roller parallel to the roller axis; said slot having a substantially circular cross section and an entrance width less than the diameter of said substantially circular cross section, and the edge of said sheet engaging said roller includes a rod positioned in a hem along said edge, said rod and hem having a diameter no greater that the diameter of said slot and greater than the width of said entrance, whereby said rod and hem can be pushed longitudinally into said slot and will be retained therein.

8. The deployable cover according to claim 1 wherein said roller comprises:
   a tubular surface member extending between said arms and spaced therefrom;
   end caps closing the ends of said tubular member and having axial openings for receiving first and second shafts;
   said first and second shafts rigidly secured to said arms with said roller rotatable about said shafts;
   a torque block surrounding said first shaft and secured to said tube for rotation therewith; and
   spring means secured between said first shaft and said torque block;
   whereby rotation of said roller relative to said shafts and arms will cause rotary torque in said spring biasing said roller toward the position prior to said rotation.

9. The deployable cover according to claim 7 wherein said slot is formed with a wall extending inwardly of said tubular surface, with said wall extending into a corresponding slot in the outer surface of said torque block, whereby said torque block is constrained to rotate with said roller while permitting limited axial movement of said torque block within said tube as tension in said spring changes.

10. The deployable cover according to claim 1 further including a bar extending between said arms adjacent to said roller.

11. In a vehicle having an open topped compartment adapted to transport quantities of particulate material, said material tending to form heaps extending above the edges of the compartment, the compartment having an extended upstanding lip along one edge and a removable cover for covering said particulate material during vehicle movement, the improvement comprising:
   a pair of spaced, substantially parallel pivotable arms pivotally mounted intermediate their ends at locations adjacent to the upstanding lip at one end of the open topped compartment;
   said arms having first elongated ends movable from first, substantially upright, stowed, positions adjacent to said upstanding lip to deployed positions extending toward the opposite, back, end of said compartment;
   a roller extending between said first elongated arm ends and in contact with said lip in the stowed position;
   a sheet of cover material secured to said roller and wrapped therearound in the stowed position;
   rotational biasing means in said roller for biasing said roller towards rotation in a direction tending to wrap said sheet about said roller;
   a second elongated arm end extending from each of said arms generally opposite each said first end;
   shock absorber means connected between said opposite sides of said compartment and said second elongated arm ends, including means biasing said arms toward said stowed position;
   a leader secured to said sheet and extending away from said roller;
   whereby said leader may be pulled away from said roller to unroll and extend said sheet to the deployed position extending to the back end of said compartment and substantially covering said compartment and to rotate said arm to said deployed position during deployment of said sheet.

12. The improvement according to claim 11 including a stiffening rod, said stiffening rod enclosed in a hem along said front edge and having a ring secured to substantially the center of said rod, and wherein said leader is a single rope secured to said ring.

13. The improvement according to claim 11 further including a guide means at substantially the center of the back end of said compartment to engage said leader and assure straight movement of said cover and prevent abrasion of said rope on the compartment edge.

14. The improvement according to claim 11 further including a slide means secured to a front edge of said cover, said slide means including an elongated tube, secured to said cover and a plate secured to said tube, said plate including means for fastening said leader to said plate adjacent to said tube, said plate extending at an angle to a straight line joining said front edge and said means for fastening whereby as said cover is pulled across said compartment and encounters a heap of material in said compartment extending above a horizontal plane through said roller, said plate will slide up and over said heap without digging into said heap.

15. The improvement according to claim 14 wherein said elongated tube includes a slot extending the length of said tube parallel to the tube axis; said slot having a substantially circular cross section and an entrance width less than the diameter of said substantially circular cross section, and the edge of said sheet engaging said roller includes a rod positioned in a hem along said edge, said rod and hem having a diameter no greater than the diameter of said circular slot and greater than the width of said entrance, whereby said rod and hem can be pushed longitudinally into said slot and will be retained therein.

16. The improvement according to claim 11 wherein the outer surface of said roller includes a slot extending the length of said roller parallel to the roller axis; said slot having a substantially circular cross section and an entrance width less than the diameter of said substantially circular cross section, and the edge of said sheet engaging said roller includes a rod positioned in a hem along said edge, said rod and hem having a diameter no greater that the diameter of said slot and greater than the width of said entrance, whereby said rod and hem can be pushed longitudinally into said slot and will be retained therein.

17. The improvement according to claim 11 wherein said roller comprises:
   a tubular surface member extending between said arms and spaced therefrom;

end caps closing the ends of said tubular member and having axial openings for receiving first and second shafts;

said first and second shafts rigidly secured to said arms with said roller rotatable about said shafts;

a torque block surrounding said first shaft and secured to said tube for rotation therewith; and spring means secured between said first shaft and said torque block;

whereby rotation of said roller relative to said shafts and arms will cause rotary torque in said spring biasing said roller toward the position prior to said rotation.

18. The improvement according to claim 17 wherein said slot is formed with a wall extending inwardly of said tubular surface, with said wall extending into a corresponding slot in the outer surface of said torque block, whereby said torque block is constrained to rotate with said roller while permitting limited axial movement of said torque block within said tube as tension in said spring changes.

19. The improvement according to claim 11 further including a bar extending between said arms adjacent to said roller.

* * * * *